Nov. 7, 1967 R. L. BROWN 3,351,760
METHODS OF EVALUATING AND INSPECTING ADHESIVELY BONDED
JOINTS AND STRUCTURES ADAPTED FOR SUCH
EVALUATION AND INSPECTION
Filed Aug. 26, 1963 2 Sheets-Sheet 1

INVENTOR
ROBERT L. BROWN
BY Robert C. Sullivan
ATTORNEY

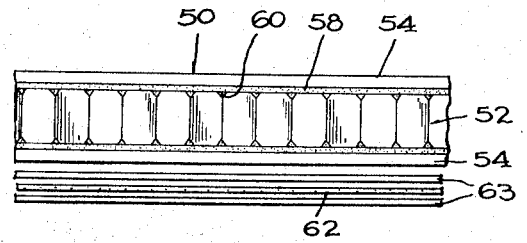
FIG. 5.
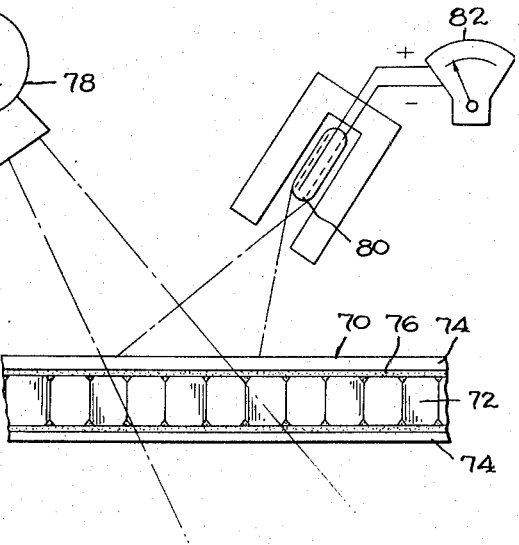
FIG. 7.
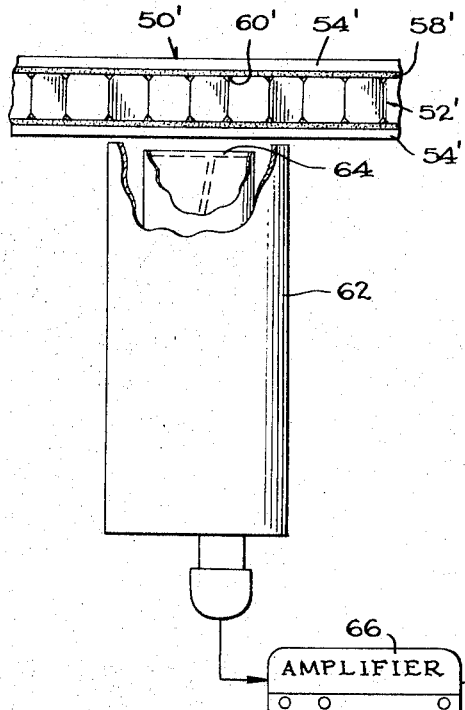
FIG. 6.
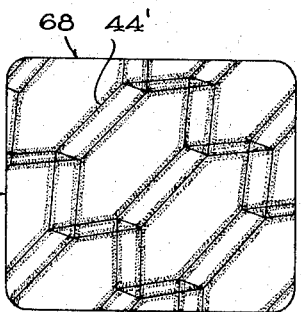
INVENTOR
ROBERT L. BROWN
BY Robert C. Sullivan
ATTORNEY United States Patent Office 3,351,760
Patented Nov. 7, 1967

3,351,760
METHODS OF EVALUATING AND INSPECTING ADHESIVELY BONDED JOINTS AND STRUCTURES ADAPTED FOR SUCH EVALUATION AND INSPECTION
Robert L. Brown, 2019 Princeton Blvd., Huntsville, Ala. 35801
Filed Aug. 26, 1963, Ser. No. 304,363
40 Claims. (Cl. 250—106)

This invention relates to the evaluation and inspection of adhesively bonded joints, and more particularly to the evaluation and inspection of adhesively bonded joints by the use of tracers uniformly distributed throughout the adhesive of the joint, and to structural members adapted therefor.

While the methods of the invention are applicable to many various types of adhesively bonded joint structures, they have particular utility in the evaluation and inspection of adhesively bonded joints in the structural form commonly known as "honeycomb sandwich panels," or more precisely as lightweight sandwich panels. The honeycomb sandwich structural form includes an inner cellular core usually, but not necessarily, shaped similarly to beeswax honeycomb and having an outer covering or skin bonded to each of the opposite major surfaces of the core to form a "sandwich." Honeycomb cores and skins are made of various metals, plastics, fiberglass, paper, asbestos, and other materials, and the skins are bonded to the core with various types of adhesives. The core and skin are sometimes made of different materials, such as fiberglass cores with aluminum skins. A honeycomb sandwich panel has the highest strength-to-weight of any known structural panel form.

Every new adhesively bonded honeycomb panel assembly design, even the simpler ones, must be checked for satisfactory bond between the opposite outer skins of the panel and the inner core of the panel. Heretofore, the methods of testing such bonded assemblies have included building a number of pre-production parts and destructively testing the parts, thus locating the weaknesses. Occasionally, a dozen or more assemblies have to be taken apart in such manner before a satisfactory evaluation can be made.

Even after the new adhesively bonded assembly is placed in production, and even though the control is rigid, no single method of inspection has heretofore been developed in the prior art which has proven 100 percent efficient in evaluating adhesive bonds in metal honeycomb, such as aluminum honeycomb, for example. The only accepted means of assuring top quality production of adhesively bonded honeycomb sandwich panels is a complex of skilled workmen, rigid quality control, and a working procedure standardized in such detail as to minimize the possibility of defectively bonded structures. This combination of controls will minimize variability which is inherent to a greater or lesser extent in all manually controlled manufacturing operations. Even after the adhesively bonded structural part is placed in production, and even though the control is rigid, quality control of the prior art is primarily based upon statistical methods. This means pulling an occasional part out of production and tearing it down to see what it looks like inside.

While it has been known in the prior art to X-ray brazed metal honeycombs, this X-ray technique has never been satisfactorily applied to the inspection and evaluation of adhesively bonded honeycomb panel joints since the adhesive bonds of the prior art are not usually detectable by radiographic methods.

Accordingly, an object of this invention is to provide improved methods of evaluating and inspecting adhesively bonded joints, and to provide joint structures adapted therefor.

Another object of this invention is to provide improved methods of evaluating and inspecting adhesively bonded joints of honeycomb sandwich panels.

Still another object of the invention is to provide improved methods of evaluating and inspecting adhesively bonded joints, particularly in honeycomb sandwich panels, using X-ray and other radiographic methods, and also using magnetic detection methods.

A further object of the invention is to provide methods of evaluating and inspecting adhesively bonded joints which can be applied with a very high degree of accuracy and with equal facility to the evaluation and inspection of prototype models of bonded assemblies as well as to production line models of the same assemblies.

A further object of the invention is to provide methods of evaluation and inspection of adhesively bonded joints which can be applied with a very high degree of accuracy to the evaluation and inspection of each adhesively bonded unit produced in a production line, in contrast to the statistical methods of prior art joint evaluation and inspection methods in which only a predetermined percentage of the production line units were evaluated and tested.

A further object of this invention is to provide a method of inspecting adhesively bonded joints which permits a manufacturer of adhesively bonded articles to certify and guarantee each part inspected as to the extent and distribution of the adhesive bond, in contrast to the prior art methods which permit only a guarantee of matching a statistically determined probability in which nothing is known of any individual part except its probability of being acceptable and in which prior art methods any part might be defective without a possibility of isolating such part before exposure by failure in service.

In achievement of these objectives, there are provided in accordance with this invention methods of evaluating and inspecting adhesively bonded joints in which tracers are uniformly distributed throughout the adhesive to permit detection of the adhesive distribution in the joint. The methods of the invention are particularly suitable for the evaluation of adhesively bonded joints of honeycomb core sandwich panels, but are not restricted to such use.

In a preferred method of the invention, radiation opaque tracers are uniformly distributed throughout the adhesive, and the bonded joint is subsequently exposed to a point source of radiation such as X-rays, or gamma rays, with the transmission of the radiation being determined by the distribution of the radiation opaque tracer in the joint structure. An image of the transmitted radiation and thus of the adhesive distribution may be obtained on a photographic negative, a fluorescent screen or on a television pick-up having a radiation sensitive screen and connected to a television monitor. Measurements may also be made by scanning the desired area with a radiation detector such as a Geiger counter, scintillation counter, or semi-conductor detector device placed similarly to the film or television pick-up.

In a modified method, a suitable radioactive material may be uniformly distributed throughout the adhesive to permit obtaining a photographic or television image of the adhesive distribution in the joint. The distribution of the adhesive may also be measured by use of suitable detection devices such as a Geiger counter, scintillation counter, or semi-conductor detection device.

In another modified method, suitable tracers may be distributed throughout the adhesive to cause a backscatter radiation when the joint is subjected to a suitable source of beta, neutron, or proton radiation. The backscatter radiation may be measured to provide an indication of the adhesive distribution in the joint.

In another modified method in accordance with the invention, which is especially suitable for evaluating adhesive distribution in a honeycomb core sandwich panel, a fluid filler having suitable tracers therein is poured into the cavity of the honeycomb sandwich panel. The panel having the fluid filling may then be exposed to a suitable source of radation and a photographic or television image may be obtained of the adhesive distribution. The adhesive distribution may also be measured using other suitable detection devices such as the Geiger counter, scintillation counter, or semi-conductor detection device.

In still another modified method in accordance with the invention, a magnetic powder may be uniformly distributed throughout the adhesive. A magnetic powder is also applied to the external surfaces of the adhesively bonded joint, and the joint assembly is subjected to a uniform magnetic field to produce a pattern of the external coating of magnetic material which is indicative of the adhesive distribution on the interior of the joint structure.

Further objects and advantages of the invention will become apparent from the following description taken in conjunction with the accompanying drawings in which:

FIGURE 5 is a diagrammatic view showing a method of testing a honeycomb sandwich panel in which the adhesive of the bonded joints includes a radioactive filler or tracer, with the image of the panel structure being exposed on a radiation-sensitive film;

FIGURE 6 is a diagrammatic view showing a method of testing a honeycomb sandwich panel in which the adhesive of the bonded joint includes a radioactive filler or tracer, and using a television pick-up and monitor system for providing an image of the adhesively bonded joints; and FIGURE 7 is a diagrammatic view showing a method of testing adhesive distribution in a honeycomb sandwich panel by measurement of backscatter radiation.

Figure 1:
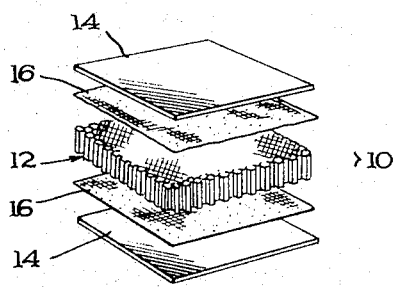
FIGURE 1 is an exploded view of a typical honeycomb sandwich panel having adhesively bonded joints.
Figure 2:
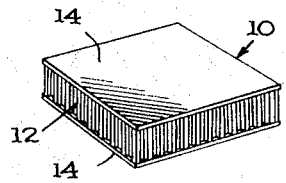
FIGURE 2 is a perspective view of the honeycomb sandwich panel of FIG. 1 in assembled condition.

Referring now to the drawings, particularly to FIGURES 1 and 2, there is shown a typical honeycomb sandwich panel structure generally indicated at 10, including a honeycomb core 12 which may be made of metal, fiberglass, or the like. The honeycomb core may be formed by various methods to include a plurality of abutting cells, each of which generally has a hexagonal shape. The honeycomb sandwich panel also includes on the outer surfaces thereof skin members or face sheets 14 which may be of a metal such as aluminum, or which may be of other metallic or non-metallic materials. In the embodiment shown in FIGURES 1 and 2, the honeycomb sandwich panel is also provided with adhesive-supporting scrim cloths 16 between the surfaces of the respective skin members or face sheets 14 and the major surfaces of the honeycomb core 12. The adhesive which secures the skin or face sheets 14 to the core 12 may be supported by the scrim cloths 16, as shown, or instead the adhesive may be an unsupported tape, fluid, paste, or powder uniformly applied between the facing surfaces of the respective skin members 14 and the major surfaces of the honeycomb core 12.

That is, the industrial adhesives which may be used for securing face sheets or skins 14 to the honeycomb core 12 may come in four basic forms, as follows:

(1) Fluid mix, suitable for brush, spray, or dip application.

(2) Paste, which is non-flowing and is used to fill cavities of considerable volume.

(3) Sheets, such as the scrim cloths 16, which may resemble the flexible plastics used for wrapping, or may have various degrees of tack which allow pressure joining similar to "Scotch" brand tape.

(4) Powder or granules, which may be heat bonded,

Many different types of adhesives may be used for joining face sheets or skins 14 and the honeycomb core 12, including the following:

(1) Combinations of thermosetting resins and elastomeric polymers: Phenolformaldehyde resins modified by vinyl polymers, ruber, or nylon are representative of this class of adhesive. These may be in the form of solutions or supported films.

(2) Epoxy resins. These are normally fluid or paste-type adhesives formulated without solvents.

(3) Epoxy-phenolic adhesive systems. These have been developed especialy for high temperature use. This type of adhesive is usually supplied in the form of a supported film.

(4) Polyamides (nylons).

(5) Silicones.

The foregoing list is not intended to be inclusive of all of the adhesives which may be used, since many other types of adhesives are available for use. Most adhesives are mixtures (co-polymers or mechanical mixes) of two or more classes of adhesive compounds.

*Use of fillers having high opacity to radiation*

One of the preferred methods of the invention is to mix with the adhesive a finely powdered inert radiation-opaque material which is uniformly dispersed throughout the adhesive. The term "inert" is used in the sense that it is not harmful to the final structure.

In selecting a radio-opaque material to be mixed with the adhesive, a guiding principle is the fact that the efficiency of an element in scattering radiation such as X-rays, and hence the radio-opacity of the element, set forth in Thompson's classical equation:

$$\frac{I_A}{I_o} = \frac{Ze^4}{2r^2m^2c^4}(1+\cos^2 \phi)$$

increases in an exponential manner with the atomic number Z of the atom and essentially depends on this one factor because of the Z position in the numerator of the equation and the fact that all of the other terms of the equation can be held constant. (See "X-rays in Practice," chapter 5, section 1, by Wayne T. Sproull, McGraw-Hill Book Co., Inc., New York, London.)

Thus, for example, the radio opacity of an element such as aluminum (atomic number 13) is proportional to $Z^1$ or 13, whereas the radio-opacity of lead (atomic number 82) is proportional to $Z^2$ or $(82)^2$ or 6,724.

This explains why lead (atomic number 82), bismuth (atomic number 83) and barium (atomic number 56) are good radio-opaque tracer source elements. All elements of higher atomic number than of bismuth have a radioactivity level which renders them unsuitable for use as tracers for X-rays.

Thus, any element between aluminum (atomic number 13) and bismuth (atomic number 83), which is solid at the normal ambient temperatures at which the structural members would be used and tested and which is not harmfully reactive with the structural member or the adhesive bond can serve as a radio-opaque tracer, although economic considerations dictate the use of only a relatively few of these elements. Elements which are suitable for use as tracers and which are economically feasible to use include the following: aluminum, silicon, manganese, iron, nickel, copper, zinc, barium, lead and bismuth.

Compounds of suitable elements between the atomic numbers of aluminum and bismuth such as compounds of the elements just listed, may also be used. Thus, the oxides, the sulfides and phosphides of suitable elements in the specified range may be used. Also, the sulfates and carbonates of suitable elements in the specified range are usually insoluble and if so will also qualify for use as tracers.

If zinc, copper, nickel, iron or manganese are used as tracer elements, they are preferably used in the pure state in powdered form, although the salts of these elements are usable.

Compounds of lead and of bismuth are by far the best economic choices for use as tracers for X-ray and gamma ray radiation. Preferred compounds of lead include the following: Lead monoxide, $PbO$; trilead tetroxide, $Pb_3O_4$; lead carbonate, $PbCO_3$; white lead, $Pb_3(OH)_2(CO_3)_2$ (basic carbonate of lead); lead sulfate, $PbSO_4$; lead chromate, $PbCrO_4$; lead sulfide, $PbS$.

Preferred compounds of bismuth which may be used include the following: bismuth ochre, $Bi_2O_3$; bismuth glance, $Bi_2S_3$. The two compounds just listed are the common bismuth compounds. Other bismuth compounds which may be used include: oxycarbonate, $(BiO)_2CO_3$; oxynitrate, $BiONO_3$.

Barium compounds which may be used include the following: barium carbonate, $BaCO_3$; and barium sulfate, $BaSO_4$. The following barium compounds are quite expensive and usually obtainable only on special order, but may also be used as tracers for X-rays and gamma rays: $Ba(IO_3)_2 \cdot H_2O$; $BaO_2$; and $BaPO_3$.

Instead of using a filler or tracer which is mechanically mixed with and uniformly distributed throughout the adhesive, the same results may be obtained by using a tracer element chemically combined in the adhesive molecule, the chemically combined tracer element providing a radiation opacity which defines the distribution of the adhesive in the same manner as provided by the mechanically mixed radio-opaque fillers or tracers. An example of a chemical combination of the type just mentioned is provided when the adhesive is an epoxy resin which has been cured with the addition of an amine. Cobalt amines containing the radical $[Co(NH_3)_6]^{+3}$ are known curing agents for this class of resins and may be mixed in any proportion with the standard amine curing agents and combined in the same manner in the epoxy chain as the regular amines.

Radiographs of honeycomb panel structures, or other adhesively bonded joints, bonded with adhesive containing a dispersed radio-opaque filler such as those previously described, show the adhesive distribution in great detail. The adhesive containing the radiation opaque filler will X-ray as a uniformly gray area on the X-ray film. Unbonded areas show up on the X-ray negative as mottled irregular areas, surrounded by a sharp transition line and by the even gray of uniform bond. Since the photographic film negative can be studied at leisure, even minute areas of defective bond can be located.

Figure 3:
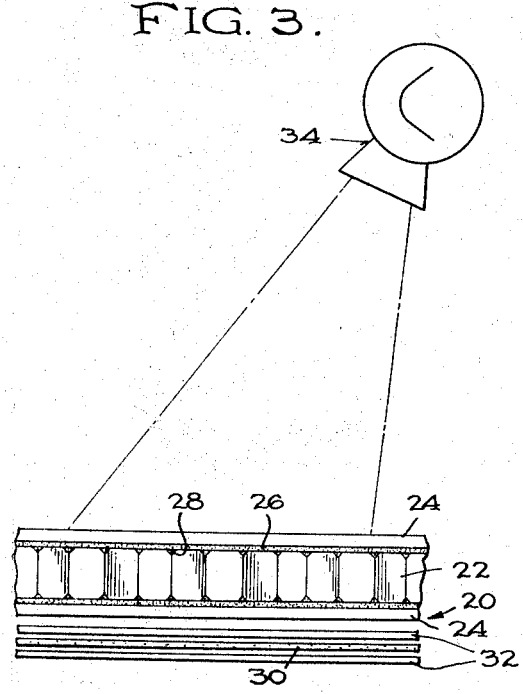
FIGURE 3 is a diagrammatic view showing a method of radiographically testing a honeycomb sandwich panel which has a radiation opaque filler uniformly distributed in the adhesive bonds, with the panel being exposed to a point source of radiation, and with the image of the panel being produced on a radiation-sensitive film.

One method of testing the honeycomb sandwich panels 10 or other adhesively attached member for distribution of adhesive, where the adhesive has a radiation opaque filler therein, is shown in FIG. 3. There is shown in FIG. 3 a honeycomb sandwich panel generally indicated at 20 similar to those shown in FIGURES 1 and 2 and including a honeycomb core 22 and outer face sheets 24. A layer of adhesive 26 is interposed between each of the face sheets 24 and the adjacent surfaces of the honeycomb core 22. The adhesive 26 forms fillets 28 between the face sheets 24 and the adjacent surfaces of the cells of the honeycomb core 22. For a satisfactory adhesive bond between the face sheets or skin and the cell walls of the honeycomb core, it is important that the fillets 28 be present. The filleting action of the adhesive is usually determined by the flow behavior of the adhesive during the cure.

A number of detecting systems exist for X-rays, including fluorescent screens, image converters of several types, photographic methods, light amplifiers and electronic devices. Since it is impractical to describe all of these various methods of viewing or measuring the adhesive distribution by radiographic techniques, only a few representative systems will be described, it being apparent to those skilled in the art that the techniques described hereinafter may be suitably modified to allow other detecting and measuring devices to be used.

X-ray film 30 having light-proof wrappings 32 abutting each of the opposite surfaces thereof, is positioned beneath the underside of the honeycomb sandwich panel 20 in closely abutting relation thereto. A source 34 of X-rays is positioned at a distance from the panel 20 such that the X-ray source will cast sharp well-defined shadows. When the adhesive 26 includes a uniformly distributed radiation opaque additive as previously described, any variation in the adhesive distribution will show up in the developed negative as variations in transmitted radiation and the pattern on the negative due to the adhesive distribution can be interpreted on this basis.

Instead of using an X-ray point source to provide a film image of the adhesive distribution shown in FIG. 3, a radioactive point source 34 of radiation such as gamma rays may be provided by use of a suitable radioisotope. The adhesive 26 of panel 20 would contain any of the radiation-opaque fillers previously described as being suitable for use with the X-ray point source, and the radiation-sensitive film 30 would show any variations in the adhesive distribution as variations in the transmitted radiation, in the same manner as previously described in connection with the X-ray point source.

Figure 4:
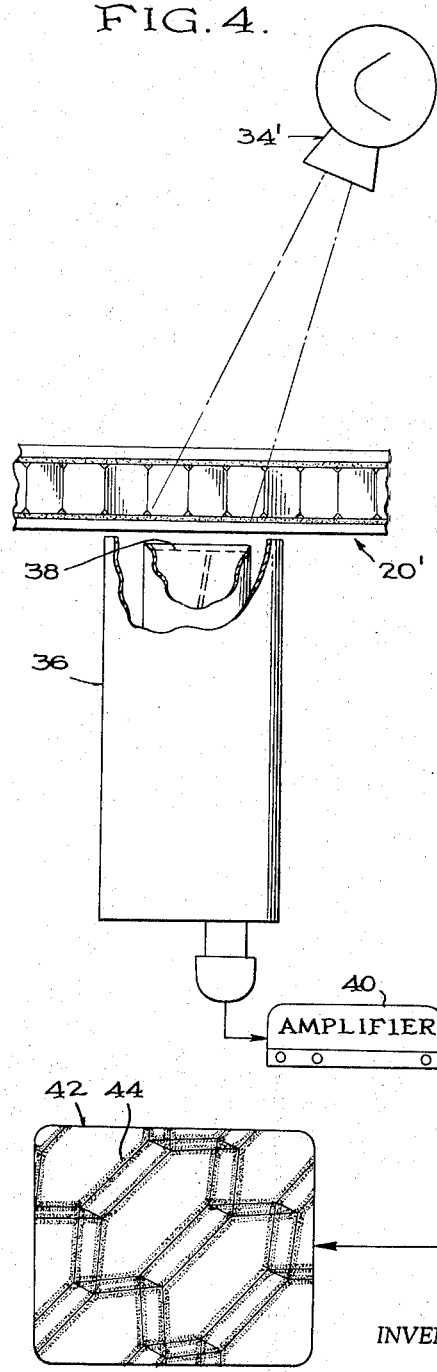
FIGURE 4 is a diagrammatic view of a modified method of inspecting a honeycomb sandwich panel having radiation opaque filler in the adhesive, the method including a point source of radiation and a television pick-up and monitor system for providing an image of the adhesively bonded joint.

A modified system is shown in FIG. 4 for evaluating the distribution of an adhesive having fillers which are opaque to X-rays or which are opaque to other point source radiation such as gamma rays. The schematic diagram of FIGURE 4 shows a honeycomb sandwich panel 20' including an adhesive bond having uniformly distributed therethrough high opacity fillers of the type previously described. A point source of X-rays or of other radiation such as a radioisotope source of gamma rays is indicated at 34' and is positioned a suitable distance from the panel 20' so that the point source will cast sharp, well-defined shadows. A television camera generally indicated at 36 is positioned adjacent the surface of panel 20' opposite the surface which faces the radiation point source 34'. The television camera includes a screen 38 sensitive to X-rays or to other radiation such as gamma rays. The image produced on the screen of the television camera is scanned and amplified by amplifier 40, and the amplified signal is transmitted to the viewing tube or monitor 42. A positive or negative image of the honeycomb core is presented on the viewing tube 42. The top and bottom bounding edges of the cells of the honeycomb core are represented on the viewing tube by fine black lines, and the fillets of adhesive between the cell walls and the outer faces or skins of the panel are visible as shadows 44 on each side of the fine black lines. These fillets would not be visible if the special adhesive containing the X-ray or radiation opaque filler were not used as previously described.

Reference is made to the following publications for teachings of television pick-up and monitoring apparatus and systems which could be employed in practicing the method diagrammatically shown in FIG. 4, and also in practicing the method shown in FIG. 6, to be hereinafter described:

*Military Specification MIL–HDBK–23*, Part 1, available at military libraries, which discusses X-ray image intensifiers of several types (with references).

*The Official Journal of the Society of Nondestructive*

*Testing*, 914 Chicago Ave., Evanston, Ill., January-February 1958, "An X-ray Image Intensifier of the Closed Circuit Television Type," pages 16–23 (with references).

Use of radioactive fillers

A modified method of evaluation and inspection of adhesively bonded joints is by the use of a radioactive source uniformly distributed throughout the adhesive. The radioactive source can be a low intensity long-life radioactive material such as uranium, thorium, or radium, or can be a suitable radioisotope. Any of the radioisotopes may be used, but I prefer to use a radioisotope having a relatively short half-life, that is, a half-life of approximately two weeks to one year. Several factors influence the emitted radiation, such as film thickness, presence or absence of fillets, fall-off of source intensity with decay of radioactivity, as well as structural configuration of the member being tested.

There are many known radioisotopes which might be used, and the following short-life radioisotopes are examples of ones which might be used:

| | Days half life |
|---|---|
| $Fe^{59}$ | 46.3 |
| $S^{35}$ | 87.1 |
| $P^{32}$ | 14.3 |
| $Ag^{111}$ | 7.5 |
| $I^{131}$ | 8.0 |

A film negative showing the distribution of the adhesive containing the radioactive source may be obtained using the arrangement of FIGURE 5 which shows a honeycomb sandwich panel generally indicated at 50 including a honeycomb core 52 and outer skin members 54. The adhesive 58 between the abutting surfaces of the skin members and the adjacent cell walls forms fillets as indicated at 60. The radiation sensitive film 62 is positioned between light-proof wrappings 63 is placed snugly against the under surface of the panel and the film is exposed in accordance with the distribution of the adhesive containing the radioactive material.

An image of the distribution of the adhesive in the joints of the panel may also be obtained by the system of FIGURE 6 which shows a honeycomb sandwich panel generally indicated at 50' including a honeycomb core 52' and outer skin members 54'. The adhesive 58' between the abutting surfaces of the skin members and the adjacent cell walls forms fillets 60'. A television camera 62 having a radiation-sensitive screen 64 is positioned closely adjacent and parallel to the outer skin of the panel being tested. The radiation-sensitive screen 64 of television camera 62 is similar to the screen 38 of television camera 36 of FIG. 4. The radiation-sensitive screen is scanned, and the resulting signal is amplified electronically by the amplifier 66 and displayed continuously on a standard viewing screen or monitor 68 which provides a positive image of the panel structure. The fillets of adhesive between the cell walls and outer faces or skins of the panel are visible as shadows 44' on each side of the fine black lines which represent the top and bottom bounding edges of the core cells.

Measurement of backscatter radiation as indication of adhesive distribution

A still further method of evaluating and inspecting adhesive distribution in adhesively bonded joints such as the honeycomb sandwich panel joints hereinbefore described is the measurement of the backscatter component of radiation which is induced in suitable tracer elements by subjecting the adhesively bonded panel or other structural unit to a suitable source of radiation which induces secondary or fluorescent radiation in the tracer element.

There is shown schematically in FIGURE 7 an arrangement which may be used to measure the backscatter component of induced radiation. The object being tested for adhesive distribution is a honeycomb sandwich panel generally indicated at 70 similar to those shown in FIGURES 1–6, inclusive, and including a honeycomb core 72 and outer face sheets 74. A layer of adhesive 76 is interposed between each of the face sheets 74 and the adjacent surfaces of the honeycomb core 72. The adhesive may have the same tracer elements therein as the radio-opaque tracer elements previously described in connection with the methods of FIGURES 3 and 4. A source of radiation 78 is directed toward the honeycomb panel. The source of radiation may be a source of beta radiation such as a radio-iosotope of cobalt or other radiation source such as strontium 90-yttrium 90, thallium 204 or cesium 137. The beta radiation induces fluorescent radiation in the tracer element in the adhesive. The reflected or scattered-back component of the induced secondary radiation may be measured by a suitable detecting device which in the diagram of FIGURE 7 is shown as a phototube 80 sensitive to the scattered back radiation. The output of the phototube 80 is connected to a suitable readout device or indicator 82. An amplifier may be connected between the detecting device 80 and the read-out device 82 to amplify the signal of the detecting device sufficiently to provide an adequate reading on the readout device 82. Other types of indicators may be used in place of the phototube shown in FIGURE 7, such as a scintillation counter, a Geiger counter, or a semi-conductor detection device such as that shown in U.S. Patent 2,706,791, Jacobs et al., or 2,706,792, Jacobs. The scattered back radiation may also be used to expose a sensitized X-ray film similar to that shown in FIGURES 3 and 5.

The secondary radiation may be induced in the tracer elements by bombarding the tracer elements with other types of radiation instead of beta radiation. Thus, a neutron source of radiation may be directed toward the adhesively bonded joint structure and will induce radiation a backscatter component of which may be detected by a suitable detection device such as those mentioned in connection with the measurement of the beta-induced backscatter radiation.

When a source of neutron radiation, such as radioactive cobalt, is directed toward the adhesively bonded joint to produce backscatter radiation, the backscatter radiation will be promoted if the adhesive has uniformly distributed throughout the body thereof a filler such as elemental boron or an insoluble salt thereof, or elemental cadmium or an insoluble salt thereof. Boron has a neutron capture cross section of 4,017 plus or minus 32 barns, while cadmium has a neutron capture cross section of 2,450 plus or minus 50 barns.

Other suitable tracer elements in the adhesive when neutron radiation is directed toward the adhesively bonded joint are the rare earths of the Lanthanide series, including samarium, europium, and gadolinium, although these would be economically impractical to use. Any of the elements just enumerated or suitable salts thereof are effective to capture neutrons. Using the through transmission technique, the fraction of the neutrons remaining out of the original beam may be counted. Also, the "primary burst" of radiation emitted by the reaction of the neutrons on tracer elements may be detected by "backscatter" measurement techniques.

A source of protons may also be directed toward an adhesively bonded joint having tracers therein of the radio-opaque type described in connection with the methods of FIGS. 3 and 4. The protons induce gamma radiation which, in turn, excite the tracer element and induce radiation which is detected by the backscatter detection method shown schematically in FIG. 7.

A source of alpha particles or of deuteron particles may also be directed toward the adhesively bonded joint and if a tracer of the radio-opaque type previously described in connection with the methods of FIGS. 3 and 4 or a suitable isotope thereof is present in the adhesive, induced radiation will be obtained which may be measured by the technique schematically illustrated in FIG. 7. Typical reactions which may be obtained using alpha, neutron, or deutron particles are given in the textbook "Modern Physics" by G. E. M. Jauncey, D. Van Nostrand Company, chapter XX, "Nuclear Physics," pages 448–450.

Secondary emission which may be measured by the backscatter detection technique of FIG. 7 may also be produced by an X-ray point source or a gamma ray point source if the adhesive has a tracer therein of the radio-opaque type previously described in connection with the methods of FIGS. 3 and 4. The secondary emission produced by the X-ray or gamma ray point source may be measured using a detection device such as the phototube 80 of FIG. 7, a Geiger counter, a scintillation counter, or a semi-conductor detection device.

Still a further method of evaluating and inspecting adhesive distribution which is particularly suited for use with the honeycomb sandwich panel is the fluid filler method which will now be described.

A volatile fluid such as water or mineral spirits has a gelatineaceous substance added thereto and is gelled to a soft jelly. A high density powder such as barium carbonate, lead acetate, or iron powder, or other radio-opaque tracer of the type described in connection with the methods of FIGS. 3 and 4, and in powder form, is thoroughly milled into the gel. The resulting high density gel can then be poured into the open cell honeycomb structure until it fills the cavity completely. A point source of X-rays, gamma rays, or other suitable radiation is then directed toward the surface of the gel which obviously conforms to the inside cavity of the honeycomb sandwich panel. A photographic negative may then be exposed to the transmitted X-ray or gamma ray radiation, as described in connection with the embodiments of FIGURES 3 and 5, or a television presentation may be made of the image in accordance with the method described in connection with FIGURES 4 and 6. After a suitable photograph or television presentation of the image has been obtained, the gel may then be removed from the honeycomb core.

A modified type of filler which may be used in place of the gel filler just described is as follows: An emulsion of water, a volatile oil, and an emulsifying agent, made into an oil-droplet-in-water-type emulsion, or water-droplet-in-oil type emulsion. The emulsion is adjusted to a viscosity which is high enough to hold a radio-opaque material of the types previously described in connection with the methods of FIGS. 3 and 4 in suspension for a minimum of approximately 30 minutes without settling. This emulsion is then poured into the hollow honeycomb sandwich panel core, and the core containing the emulsion may then be subjected to X-rays, gamma rays, or other radiation, with the distribution of the adhesive being shown either on a photographic negative or in a television presentation as previously described.

In using the emulsion filler method just described, if the tracer material is a metallic powder in elemental form, the tracer is preferably suspended in an oil-droplet-in-water type emulsion, whereas if the tracer is composed of a metallic salt, the salt compound is preferably suspended in the water-droplet-in-oil type of emulsion.

In utilizing the gel filler method or the emulsion filler method as just described, the tracer used may be any of the radio-opaque tracers described as suitable for use with the methods of FIGS. 3 and 4 with the exception of the form in which the radio-opaque element is chemically combined with the adhesive, which would not be pertinent for use with the gel filler or emulsion filler methods.

Still a further modified method of obtaining an indication of the adhesive distribution in an adhesively bonded joint, such as a honeycomb sandwich panel joint, is to uniformly distribute a magnetic material such as finely powdered iron or magnetic iron oxide throughout the body of the adhesive. The adhesively bonded structural member is then coated on the exterior surface thereof with a powdered magnetic material such as finely powdered iron or iron oxide. The structural member, such as the honeycomb sandwich panel, having the adhesively bonded joints with magnetic powder therein, and having the coating of magnetic powder on the exterior surfaces thereof, is then positioned inside the high level uniform magnetic field of a magnetic particle testing device, and the field distortion due to the magnetic powder in the adhesively bonded joints becomes visible in the pattern of the magnetic powder on the external surfaces of the honeycomb panel, thereby providing a pictorial display directly on the external surfaces of the honeycomb panel of the adhesive distribution on the interior of the panel immediately adjacent to the skin being examined.

For a teaching of a magnetic testing procedures and apparatus which might be used in connection with the adhesive distribution method just described, reference is made to "The Metals Handbook," 1949, The American Society for Metals, publisher, "Magnetic Particle Inspection," by R. R. Moore, pages 145–149.

It can be seen from the foregoing that there are provided in accordance with this invention methods of evaluating and inspecting adhesively bonded joints and joint structures adapted to such evaluation and inspection, which have great utility and which permit accurate evaluation of the distribution of the adhesive in the joints. Most of the methods in accordance with the invention are adapted for use on each unit of a production line, in contrast to prior art methods which are only suitable for statistical evaluation in which only a predetermined percentage of the production line units are evaluated. The methods of the invention have particular utility in the inspection of adhesively bonded honeycomb sandwich panels, but are not restricted to such use.

While there have been shown and described particular embodiments of the invention, it will be obvious to those skilled in the art that various changes and modifications may be made therein without departing from the invention, and therefore, it is aimed to cover all such changes and modifications as fall within the true spirit and scope of the invention.

What I claim as my invention is:

1. The method of evaluating and inspecting adhesively bonded joints in structural members which comprises the steps of uniformly distributing a tracer material throughout the body of the adhesive before application of the adhesive to the structural member, and subsequently detecting the presence of the tracer material in the structural member as an indication of the adhesive distribution in the structural member.

2. The method of evaluating and inspecting adhesively bonded joints in structural members which comprises the steps of uniformly distributing a radiation-opaque material throughout the body of the adhesive before application of the adhesive to the structural member, directing a source of radiation toward the structural member having the adhesive with the radiation-opaque material therein, and detecting the effect produced on the radiation by the radiation-opaque material in the adhesive as an indication of the adhesive distribution in the structural member.

3. The method defined in claim 2 in which radiation sensitive photographic film is positioned in the path of radiation emerging from the structural member and said film is exposed as an indication of the adhesive distribution in the structural member.

4. The method defined in claim 2 in which a television pick-up device having a radiation sensitive screen is positioned in the path of radiation emerging from the structural member and the image produced on said screen is transmitted to a television viewing device.

5. The method defined in claim 2 in which a radiation sensitive fluorescent screen is positioned in the path of radiation emerging from the structural member and the image produced on said screen is an indication of the adhesive distribution in the structural member.

6. The method defined in claim 2 in which said radiation-opaque material is a normally solid element having an atomic number between 13 and 83, inclusive.

7. The method defined in claim 2 in which said radiation-opaque material is barium.

8. The method defined in claim 2 in which said radiation-opaque material is lead.

9. The method defined in claim 2 in which said radiation-opaque material is bismuth.

10. The method defined in claim 2 in which said radiation-opaque material is a normally solid compound of an element having an atomic number between 13 and 83, inclusive.

11. The method defined in claim 2 in which said radiation-opaque material is a lead compound.

12. The method defined in claim 2 in which said radiation-opaque material is a barium compound.

13. The method defined in claim 2 in which said radiation-opaque material is a bismuth compound.

14. The method defined in claim 2 in which said radiation-opaque material is a radiation-opaque compound selected from the group consisting of oxides, sulfides, sulfates, phosphides, carbonates of an element having an atomic number between 13 and 83, inclusive.

15. The method defined in claim 2 in which said radiation-opaque material is chemically combined with the adhesive.

16. The method defined in claim 2 in which said adhesive is an epoxy resin and said radiation-opaque material is a cobalt amine containing the radical $[Co(NH_3)_6]^{+3}$ which is chemically combined with the epoxy resin.

17. The method of evaluating and inspecting adhesively bonded joints in structural members which comprises the steps of uniformly distributing a radioactive material throughout the body of the adhesive before application of the adhesive to the structural member, and subsequently detecting the presence of the radioactive material in the structural member as an indication of the adhesive distribution in the structural member.

18. The method defined in claim 17 in which the radioactive material is chosen from the group consisting of uranium, thorium, and radium.

19. The method defined in claim 17 in which the radioactive material is a radioisotope having a half life of not more than one year.

20. The method defined in claim 17 in which radiation-sensitive photographic film is positioned in the path of radiation emerging from the structural member and said film is exposed as an indication of the adhesive distribution in the structural member.

21. The method defined in claim 17 in which a television pick-up device having a radiation-sensitive screen is positioned in the path of radiation emerging from the structural member and the image produced on said screen is transmitted to a television viewing device.

22. The method of evaluating and inspecting adhesively bonded joints in structural members which comprises the steps of uniformly distributing throughout the body of the adhesive before application of the adhesive to the structural member a tracer material capable of having secondary radiation induced therein, directing energy for inducing secondary radiation in said tracer material toward the structural member having the adhesive with the tracer material therein, and measuring at least a component of the secondary radiation induced in said tracer material as an indication of the adhesive distribution in the structural member.

23. The method defined in claim 22 in which the backscatter component of the secondary radiation is measured.

24. The method defined in claim 22 in which a stream of alpha particles is directed toward the structural member.

25. The method defined in claim 22 in which a stream of beta particles is directed toward the structural member.

26. The method defined in claim 22 in which a stream of deuteron particles is directed toward the structural member.

27. The method defined in claim 22 in which a stream of neutron particles is directed toward the structural member.

28. The method defined in claim 22 in which a stream of proton particles is directed toward the structural member.

29. The method of evaluating and inspecting adhesively bonded joints in structural members which comprises the steps of uniformly distributing a magnetic material throughout the body of the adhesive before application of the adhesive to the structural member, applying said adhesive with the magnetic material uniformly distributed therethrough to bond the joints of the structural member, coating the exterior surface of the structural member with a powdered magnetic material, subjecting the structural member with the powdered magnetic material on the exterior surface thereof to a high level uniform magnetic field, and subsequently detecting the presence of the magnetic material in the structural member as an indication of the adhesive distribution in the structural member by observation of the pattern of the magnetic powder on the external surface of the structural member as produced by the interaction of the powdered magnetic material on the external surface of the structural member with the magnetic material in the adhesive which bonds the joints of the structural member.

30. The method of evaluating and inspecting adhesively bonded joints in structural members of the type having void spaces therein which comprises the steps of substantially uniformly distributing a tracer material throughout a carrier medium, introducing said carrier medium with said tracer material distributed therethrough into the void spaces of the structural member, and detecting the presence of the tracer material in the void spaces of the structural member as an indication of the adhesive distribution in the structural member.

31. The method defined in claim 30 in which said structural member is a lightweight sandwich panel having a core of the honeycomb cell type.

32. The method of evaluating and inspecting adhesively bonded joints in structural members of the type having void spaces therein which comprises the steps of substantially uniformly distributing a radiation-opaque material throughout a carrier medium, introducing said carrier medium with said radiation-opaque material distributed therethrough into the void spaces of the structural member, directing a source of radiation toward the structural member having the carrier medium in the void spaces thereof, and detecting the effect produced on the radiation by the radiation-opaque material as an indication of the adhesive distribution in the structural member.

33. The method defined in claim 32 in which said structural member is a lightweight sandwich panel having a core of the honeycomb cell type.

34. The method of evaluating and inspecting adhesively bonded joints in structural members of the type having void spaces therein which comprises the steps of forming a jelly-like mixture having a radiation-opaque tracer material distributed substantially uniformly therethrough, introducing said jelly-like mixture into the void spaces of the structural member, directing a source of radiation toward the structural member having the mixture in the void spaces thereof, and detecting the effect produced on the radiation by the radiation-opaque material as an indication of the adhesive distribution in the structural member.

35. The method of evaluating and inspecting adhesively bonded joints in structural members of the type having void spaces therein which comprises the steps of forming an emulsion having a radiation-opaque material suspended therein, introducing said emulsion into the void spaces of the structural member, directing a source of radiation toward the structural member having the emulsion in the void spaces thereof, and detecting the effect produced on the radiation by the radiation-opaque material as an indication of the adhesive distribution in the structural member.

36. A structural member including at least two component structural elements connected to each other at a joint, adhesive material securing said structural elements together at said joint, said adhesive material having substantially uniformly distributed throughout the body thereof of a tracer material whose presence may be detected as an indication of the distribution of the adhesive material in the structural member.

37. A structural member including at least two component structural elements connected to each other at a joint, adhesive material securing said structural elements together at said joint, said adhesive material having substantially uniformly distributed throughout the body thereof a radiation-opaque tracer element whose presence may be detected as an indication of the distribution of the adhesive material in the structural member.

38. A structural member including at least two component structural elements connected to each other at a joint, adhesive material securing said structural elements together at said joint, said adhesive material having substantially uniformly distributed throughout the body thereof a radioactive tracer element whose presence may be detected as an indication of the distribution of the adhesive material in the structural member.

39. A structural member including at least two component structural elements connected to each other at a joint, adhesive material securing said structural elements together at said joint, said adhesive material having substantially uniformly distributed throughout the body thereof of a tracer element of magnetic material whose presence may be detected as an indication of the distribution of the adhesive material in the structural member.

40. A lightweight sandwich panel including a core of the honeycomb cell type and face sheets bonded by adhesive material to the opposite major surfaces of said core, said adhesive material having substantially uniformly distributed throughout the body thereof a tracer material whose presence may be detected as an indication of the distribution of the adhesive material in the sandwich panel.

References Cited
UNITED STATES PATENTS

| | | | |
|---|---|---|---|
| 2,158,409 | 5/1939 | De Forest | 324—38 |
| 2,228,623 | 1/1941 | Eunis | 324—37 |
| 2,318,667 | 5/1943 | Bruce | 250—51.5 |
| 2,475,596 | 7/1949 | Dawson | 250—65 |
| 2,549,109 | 4/1951 | McPhee | 250—106 |
| 2,680,900 | 6/1954 | Linderman | 250—106 |
| 2,858,451 | 10/1958 | Silversher | 250—108 |
| 2,915,639 | 12/1959 | Gilbert et al. | 250—106 |
| 3,056,028 | 9/1962 | Mattingly | 250—108 |
| 3,018,375 | 1/1962 | Graves | 250—65 |
| 3,143,512 | 8/1964 | Kline | 252—478 |
| 3,154,684 | 10/1964 | Ziegler | 250—51.5 |

RALPH G. NILSON, *Primary Examiner.*

J. W. LAWRENCE, S. ELBAUM, *Assistant Examiners.*